INVENTOR.
Donald R. Riccio
BY
F. J. Hodale
ATTORNEY

United States Patent Office 3,451,736
Patented June 24, 1969

3,451,736
ANTIROTATION MEANS
Donald R. Riccio, Milan, Ohio, assignor to General Motors Corporation, Detroit, Mich., a corporation of Delaware
Filed Mar. 24, 1967, Ser. No. 625,714
Int. Cl. F16c 33/30, 33/00; B21d 53/12
U.S. Cl. 308—236                                    3 Claims

ABSTRACT OF THE DISCLOSURE

A bearing having two narrow bands of serrations on is outer race which are spaced below the outer surface of the outer race. The bearing is mounted in a bore and a plastic is injected between the mounting bore and the serrations. When the plastic hardens, the bearing outer race is keyed within the bore both axially and circumferentially. By maintaining the bands of serrations relatively narrow, the bearing may also be mounted in a conventional manner.

---

This invention relates generally to antifriction bearings and the mounting thereof and more specifically to an antifriction bearing which has its outer race adapted to be nonrotatably and axially secured within a mounting bore and to an antifriction bearing so mounted.

Generally, a bearing is mounted so that its outer race will not rotate in operation to eliminate vibration and chatter which causes premature failure of the bearing or pound out of its mount which causes premature failure of the mount. Also in some bearing applications, it is essential that the bearing be accurately located axially in its mount. Accordingly, it is an object of this invention to provide a bearing which may be mounted in a bore such that its outer race is nonrotatable and such that the bearing may be located axially in the bore with a high degree of accuracy.

Another object of this invention is to provide a bearing mounted in a bore by a plastic material molded in situ to key the outer race of the bearing in the bore both axially and nonrotatably.

Another object of the invention is to provide a bearing adapted to be so mounted which is relatively cheap and inexpensive to manufacture.

Another object of this invention is to provide such a bearing with an outer race which is especially adapted to be mounted in the above-described manner and yet be capable of use in general applications with more conventional mountings.

Other objects and advantages of the invention will hereinafter become more fully apparent from the following description of the annexed drawings, which illustrate a preferred embodiment, and wherein.

Figure 1:
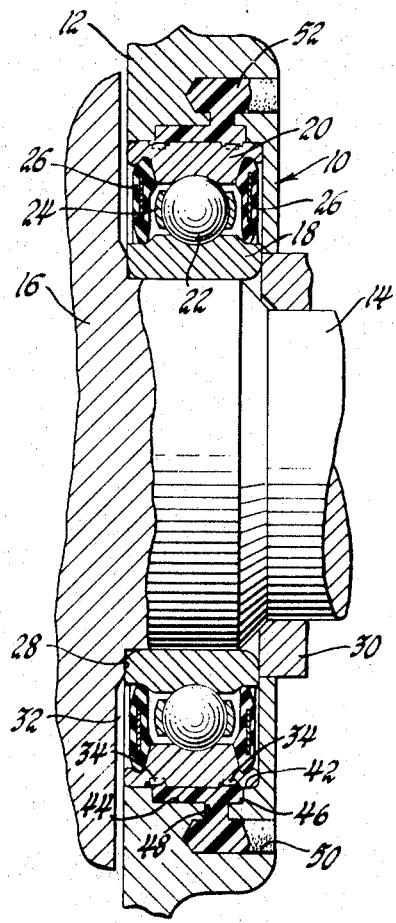
FIGURE 1 is a fragmentary elevation partially in cross section of an air pump provided with an antifriction bearing in accordance with my invention.

Referring now to the drawings and more particularly to FIGURE 1, there is shown a bearing indicated generally at 10 mounted in a housing 12 to rotatably support a shaft 14 integral with a pump rotor 16. The bearing 10 illustrated is a deep groove ball bearing having a thrust capability in either direction and thus can be used to locate the shaft 14 and integral rotor 16 axially with respect to the housing 12. However, it is to be understood that my invention is not limited to ball bearings but is equally applicable to other types of antifriction bearings which are capable of axially locating a rotating part with respect to a fixed mount.

The ball bearing 10 comprises an inner race 18, an outer race 20 radially spaced by a complement of balls 22 which are circumferentially spaced by a separator or cage 24. Seals 26 mounted to the outer race on each side of the ball complement 22 wipingly engage lands on the inner face 18 to maintain lubricant within the bearing and to keep out dirt and other deleterious matter. The inner race 18 is mounted on the shaft 14 and located axially on it between a shoulder 28 on the rotor 16 and a collar 30 on the shaft 14. The shoulder 28 on the rotor 26 provides an air gap 32 between the rotor 16 and the housing 12 which must be maintained and accordingly it is important that the bearing 10 be located axially accurately in the housing 12. It is likewise important that the outer race 20 be nonrotatable in the mount 12. To this end the outer race 20 has been specifically adapted.

Figure 4:
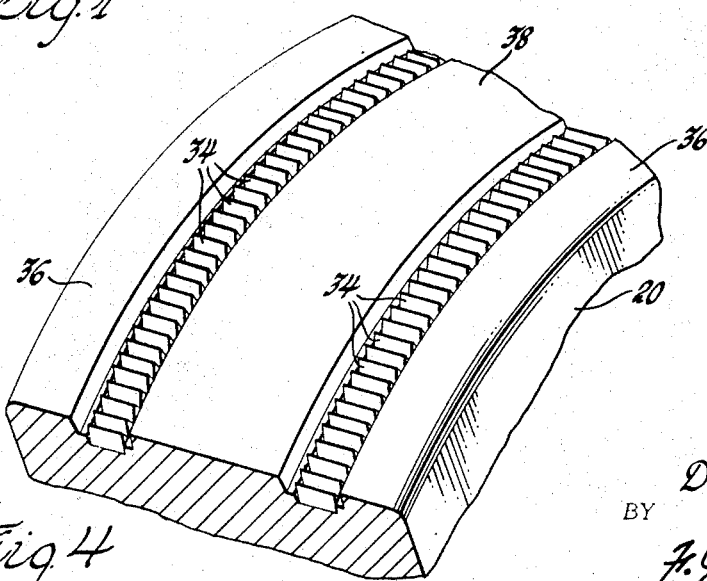
FIGURE 4 is a fragmentary perspective view of the outer race of the bearing shown in FIGURE 1.

Referring now to FIGURE 4, a portion of the outer race 20 is shown. It is seen to have a pair of axially spaced bands of serrations 34. These bands are relatively narrow compared to the axial extent or width of the outer race 20. For instance, in an outer race having a width of .4724 inch, the width of the bands 34 will be approximately .075 inch each with the lands 36 to the outside of the bands having about the same dimension leaving a wide inner land 38 of about .1724 inch. Thus the axial extent of the bands 34 is somewhat less than 30% of the width of the race 20.

Figure 2:
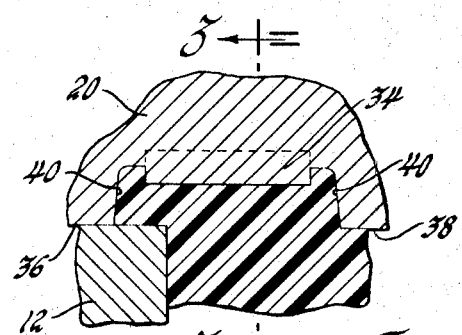
FIGURE 2 is an enlarged fragmentary view of a portion of FIGURE 1.

Referring now to FIGURE 2, it is seen that the peaks of the serrations 34 are spaced radially inwardly of the cylindrical outer surface of the outer race 20 which includes the land areas 36 and 38. The feature of recessing the serrations 34 together with the feature of maintaining the bands 34 relatively narrow is important since the bearing may be produced in high volume so as to be capable of being mounted in accordance with my invention and yet with more than 70% of the outer surface of the outer race being unaffected by the serrations, the bearing still may be mounted in a conventional manner. In addition, the features allow the outer race to be held in conventional chucks during machining and grinding of the race. The recessing of the serration bands 34 provides another important function in that is creates radial abutments 40, the function of which will be explained below.

Figure 3:
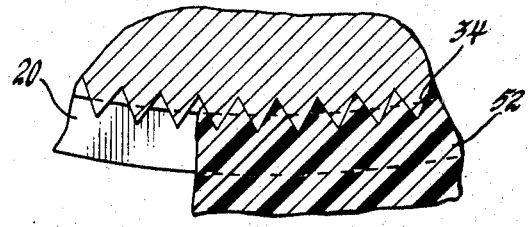
FIGURE 3 is a section taken along the line 3—3 of FIGURE 2 and looking in the direction of the arrows.

Returning to FIGURE 1, it is seen that the housing 12 which mounts the bearing has a bore 42 with a circumferential groove 44. The circumferential groove 44 communicates with the recessed serration bands 34 and forms a chamber 46 therewith. The chamber 46 opens to the outer surface of the housing 12 through a radial passage 48 and an axial passage 50. As also is evident from FIGURE 1, the chamber 46 and passages 48 and 50 are filled with a thermoplastic material 52, such as an epoxy or polyester resin. The plastic material 52 is injected into the chamber 46 via passages 48 and 50 in a nonsolidified state after the bearing has been located accurately axially in the bore 42. The plastic 52 is molded or hardened in situ after which the bearing 10 is located axially within the bore 42 by reason of the radial shoulders 40. See FIGURE 2. Also the outer race 20 is nonrotatably keyed to the bore 42 by reason of the serration bands 34. See FIGURE 3. It is advantageous to manufacture the bearing race by rolling the serration bands 34 in the outer race before it is heat treated thereby making the rolling operation relatively simple. Since the bands of serrations 34 are relatively narrow, they may be rolled in this stage of the manufacture since the outer race can be gripped in a conventional chuck for grinding operations after it is heat treated.

Various modifications are contemplated and may obviously be resorted to by those skilled in the art without departing from the spirit and scope of the invention as hereinafter defined by the appended claims, as only a preferred embodiment thereof has been disclosed.

I claim:

1. The combination comprising a support having a bore defined by a circumferential wall, a circumferential groove in said wall, passage means extending from the exterior of said support to said groove, an antifriction bearing disposed in said bore with the outer surface of its outer race abutting said wall, a pair of axially spaced bands of serrations in said outer surface, the width of said bands being a minor portion of the width of said outer race, said bands being spaced radially inwardly of the said wall, a chamber bounded by said bands and said circumferential groove, and a plastic material molded in situ in said chamber whereby said outer race is secured in said bore both axially and circumferentially.

2. In an antifriction bearing with an outer race having an outer surface lying in a generally cylindrical plane, the improvement comprising, a pair of axially oriented bands of serrations on said race spaced radially inwardly of said cylindrical plane, said bands being spaced from the ends of said bearing and from each other and having an additive width which is a minor portion of the width of said race whereby said bearing is adapted to be mounted in at least two different manners.

3. In an antifriction bearing with a race having a circumferential surface lying in a generally cylindrical plane, the improvement comprising,
a pair of bands of continuous serrations having peaks spaced radially inwardly of said cylindrical plane,
each of said bands being spaced inboard of the end of said bearing race to provide a land in said cylindrical plane outboard of each of said bands,
said bands being spaced from each other to provide a central land in said cylindrical surface,
said lands constituting approximately 70% of said cylindrical surface of said bearing whereby said bearing is adapted to be mounted in at least two different manners.

References Cited
UNITED STATES PATENTS

| | | | |
|---|---|---|---|
| 2,700,581 | 1/1955 | Migny | 308—236 X |
| 3,066,000 | 11/1962 | James et al. | 308—236 |

CARROLL B. DORITY, JR., *Primary Examiner.*

U.S. Cl. X.R.

29—148.4